Figure 8:
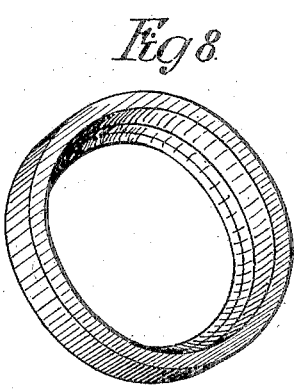

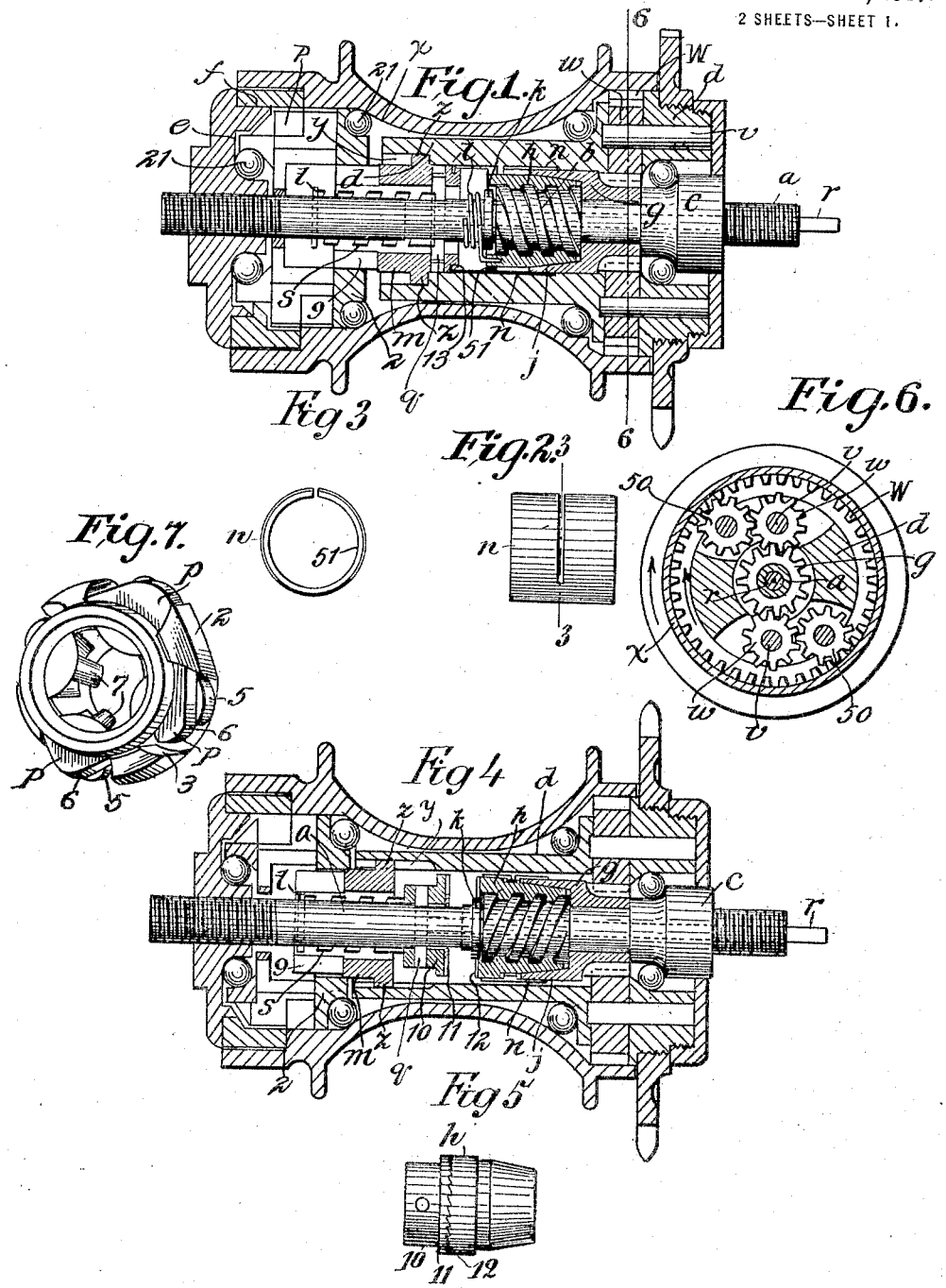

F. J. OLSEN.
FREE WHEEL HUB WITH A PLURALITY OF GEARS.
APPLICATION FILED JULY 15, 1912.

1,249,658.

Patented Dec. 11, 1917.
2 SHEETS—SHEET 2.

Inventor
F. J. Olsen.
by B. Singer
Attorney

UNITED STATES PATENT OFFICE.

FREDERIK JOHANNES OLSEN, OF ESKEBJERGGAARD PR. SVEBÖLLE, DENMARK.

FREE-WHEEL HUB WITH A PLURALITY OF GEARS.

1,249,658. Specification of Letters Patent. Patented Dec. 11, 1917.

Application filed July 15, 1912. Serial No. 709,612.

*To all whom it may concern:*

Be it known that I, FREDERIK JOHANNES OLSEN, a subject of the King of Denmark, and residing at Eskebjerggaard pr. Svebölle, Denmark, have invented certain new and useful Improvements in Free-Wheel Hubs with a Plurality of Gears, of which the following is a full, clear, and exact description.

In my previous application, Serial No. 658,621 of Novbr. 4th, 1911, I have disclosed a free wheel hub with a plurality of gears, and a prominent feature in the same is that a friction body, (a tubular spring sleeve which is cut up) rotating with the sprocket wheel, through axial displacement is brought into or out of frictional engagement with a screw threaded sleeve, which through axial displacement on the fixed shaft causes coupling or uncoupling of the sun wheel of the planetary system.

Hubs of this kind suffer from the drawback that the highest gearing is that, at which the transmission of the power takes place through the pinions, while the lowest gearing is produced by different parts of the hub being coupled together into a whole. The highest gearing being most used and the lower gearing, which is generally only used driving up hill and in a strong, contrary wind, being relatively less used, it would be more rational to let the gearing which is most used, *i. e.* the highest gearing, be the one at which no relative movements take place between the parts of the hub, while the transmission of the power through the pinions will then be relatively less used. This can be attained by a pinion being inserted between the planet wheel and the sun wheel, which pinion reverses the direction of the rotation of the sun wheel during free running. This device is well known, being shown in my prior application, 658,623, filed November 4, 1911, now abandoned, and German Patent 55,513. When this device is used in connection with hubs of the kind according to the present invention this incurs a slight alteration in the arrangement of the friction body previously mentioned. While the screw which is fixed on the shaft has a left hand thread according to my above named previous application, 658,621 the screw according to the present invention must have a right hand thread, since coupling of the sun wheel to the fixed shaft in the manner stated in my previous application will otherwise not be possible.

If, however, a right hand screw is used, the above named friction body must rotate in the opposite direction in order to be able to effect coupling and uncoupling of the sun wheel. According to the present invention this is obtained by arranging the friction body in question, which screws the sleeve forward and backward on the screw, on the sun wheel proper and rotating said body with the wheel by means of friction. It is found, moreover, that this arrangement of the friction body can be used with a system having only one planet pinion.

In the drawing—

Figure 9:
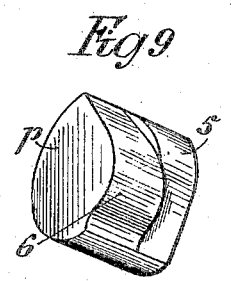
Figure 10:
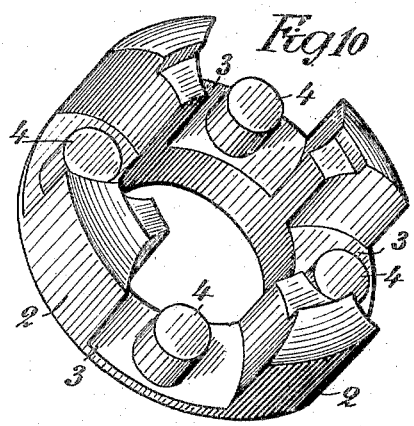
Figure 13:
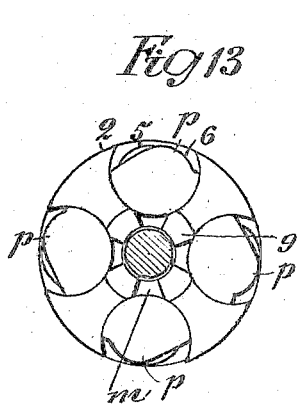
Figure 11:
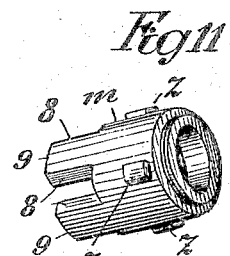
Figure 14:
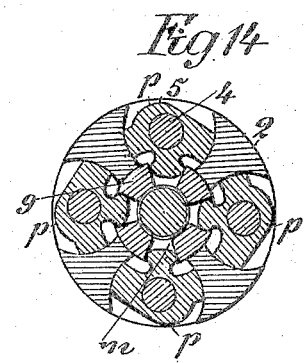
Figure 12:
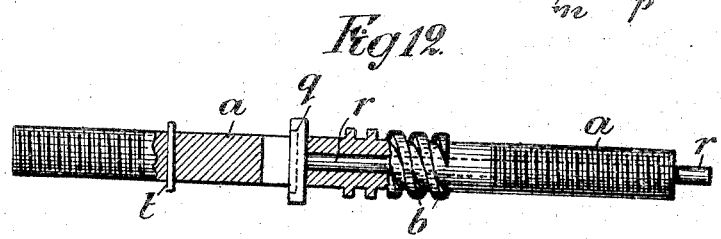

Figure 1 shows a section through the parts in question of a hub according to the invention, Fig. 2 a side view of the friction spring, Fig. 3 the same in section according to the line 3—3, Fig. 2, Fig. 4 a modification, and Fig. 5 a detail of the form shown in Fig. 4, Fig. 6 is a transverse section on the line 6—6 of Fig. 1, Fig. 7 is a perspective view showing my improved cam mechanism for driving and braking the outer hub, Fig. 8 is a detail of construction, Fig. 9 shows the specific construction of the cam member, Fig. 10, discloses the inner casing, Fig. 11, a sleeve member, Fig. 12, discloses the specific construction of the fixed shaft, Fig. 13, is a detail in side elevation of the form shown in Fig. 4, and Fig. 14 is similar to Fig. 13, except that it discloses the parts in cross section.

The different parts are designated by the same letters as the corresponding parts in my previous application numbered 658,621. *a* is a fixed shaft, which is provided with a worm thread *b* and a cone *c* for the ball bearing. *d* is the inner hub casing and *e* a disk mounted on the shaft *a* serving for securing the brake ring *f*. A sun gear *g* provided with a hollow cone *j* is mounted loosely on the shaft *a*, between the worm *b*, and the cone *c*, which gear can be coupled to or released from respectively the shaft *a*, by means of an interiorly threaded sleeve *h* arranged on the worm *b*.

The sleeve $h$ is acted upon by a torsion spring $i$ which is adapted to turn the sleeve so as to uncouple the same from the wheel $g$ whenever the latter is free to turn. $k$ is a shoulder on the shaft limiting the displacement of sleeve $h$ on worm $b$, due to the action of spring $i$.

The displacement of the sleeve $h$ takes place by means of a resilient coupling ring $n$, having an interior friction flange 51 engaging one end of the sleeve $h$. A sleeve $m$, loosely carries the resilient coupling ring $n$ and is shifted axially by means of a rod $r$, which is led through the hollow shaft $a$ engaging the sleeve $m$ by means of a pin $q$, which is led through a slit in the shaft $a$ and enters into openings in the sleeve $m$. It will be understood that sleeve $n$ while shifted axially by sleeve $m$, is rotated only by the sun gear $g$.

The pin $q$ is acted upon by one end of helical spring $s$, which is placed at one side of the sleeve $m$ surrounding the shaft $a$, and fixed at $t$, so that the spring $s$ tends to force the sleeve $m$ into the position shown in Fig. 1, when the stress within the spring, caused by displacement of the sleeve $m$, is released. In the position shown in Fig. 1, the gear $g$ is coupled to the shaft $a$. The gear $g$ is constantly in mesh with the gears $w$ which turn on pins $v$, and the gears $w$ are constantly in mesh with gears 50 also journaled on pins carried by $d$ and which mesh with the inner toothed rim $w$ of the outer hub casing $x$. In order to prevent turning of the sleeve $m$, the same is provided with projections $z$, engaging with slits or longitudinal slots $y$ in the inner hub casing $d$, so that the latter and the sleeve $m$ are connected to rotate together; however, on account of the slits $y$ having a certain length, the parts can be sufficiently manually displaced to effect coupling or connecting of the gear $g$. The worm $b$ is right handed and the friction spring $n$ has the form shown in Figs. 1–3, and is arranged in such a manner that it will follow the axial displacement of the sleeve $m$ without following the rotation of the same, while it is carried around by the sun wheel $g$ through friction. It will be understood that the friction spring $n$ engages the sleeve $m$ by means of a flange 13 shown in Fig. 1 which fits into a groove in the end of the sleeve $m$ with sufficient looseness so that the spring $n$ may turn independently of the sleeve $m$ when the parts are in the position shown in Fig. 1, the friction flange 51 of the spring $n$ is in engagement with the sleeve $h$ and the spring $n$ will be turned by means of its frictional engagement with the surface of the sun gear $g$. If now the sleeve $m$ is shifted to the left by means of the rod $r$, the spring $n$ will continue to turn with the sun gear $g$ but the sleeve $h$ will not be affected thereby because the flange 51 will be moved out of engagement therewith. As seen in Figs. 2 and 3 the spring $n$ is tubular and cut lengthwise for its entire length, while it is also partly cut up crosswise, so that the two parts of both sides of the cutting can yield independently of each other. In the position of the parts shown in Fig. 1 the sun wheel $g$ is coupled to the shaft $a$ and the low gearing is in activity. If the pedals are now kept quiet during forward running the sun wheel $g$ will, owing to the pinions inserted between the same and the planet wheels, move forward too and thereby unscrew the sleeve $h$, so as to loosen the same and free running arises. If now forward pedaling is effected, the sun wheel will turn backward while the spring $n$ will follow the rotation of the sun wheel and couple the sleeve $h$ anew. If the sleeve $m$ is displaced to the left by means of the rod $r$, the spring sleeve $n$ will be brought out of engagement with the sleeve $h$ which is now by the torsion spring $i$ turned against the shoulder $k$, against which it rests until again through displacement of the sleeve $m$ it comes into engagement with the spring sleeve $n$.

The outer hub casing is denoted by $x$ and on this member acts the brake ring $f$, on one hand, and driving bodies $p$ on the other hand. Within the left hub is an inner casing 2 which is rotatably mounted on balls 21 and which is formed with a number of cavities 3 (Fig. 7), in which the bodies $p$, for effecting the braking and the coupling, are arranged. Parts of the outer surfaces of these bodies are cylindrical, as shown at 20, and fit in the cavities 3. The bodies are pivotally mounted on studs 4 which preferably are integral with the part 2. The outer circumferences of the bodies $p$ are oblique and provided with cams 5, which can engage the brake ring $f$, and with oppositely arranged cams 6, which can engage the cylindrical surface of the outer hub casing. Each of the cams 5 and 6 only extend about half the length of the bodies $i$, axially. The bodies $p$ further carry radial projections 7 of the shape shown in Fig. 7, extending along the axis of the hub, toward the middle thereof, into slots 8 in the sleeve $m$, the slots 8 being formed between teeth or projections 9.

In the position shown in Fig. 7, the cams 5 do not exert any pressure against the brake ring $f$, and the cams 6 do not touch the inner surface of the casing, so that the outer hub casing can run freely on its ball bearings in both directions. When the cranks are turned forwardly together with the sprocket wheel, and the sun wheel is loose on the shaft $a$, the turning of the inner casing $d$ causes 8 to turn the bodies $p$ around their studs 4 so as to cause the cams 6 to bear against the cylindrical surface of the outer hub casing, thereby coupling the casing by friction and causing the same to rotate with the sprocket wheel. If then the crank be turned backward, the teeth 9 act upon the projections 7 and turn the bodies $p$ in the opposite direction, the cams 5 then bear against the brake ring $f$ extending the same against the casing so as to obtain a braking action.

Fig. 4 shows that the same construction and arrangement of the spring $n$ is also employable in hubs of the kind indicated in the specification 658,621 referred to above with the ordinary construction of the planet wheel system. The fact that the spring $n$ is driven by the sun wheel $g$ instead of by the sleeve $m$, makes it unnecessary to axially displace the same in order to effect a change of the gear ratio.

The rod $r$ can in this case act upon a displaceable ring 10, one end surface of which is provided with coupling teeth 11. This ring can be displaced into engagement with teeth 12 on the end of the sleeve $h$, and thereby retain the same (vide Fig. 5), so that during the free running it remains uncoupled from the sun wheel, and that the friction spring $n$ cannot again couple the same to the fixed shaft before the ring 10 has been carried back to the position shown in Fig. 4. The torsion spring $i$ shown in Fig. 1 is not used here.

Having now particularly described and ascertained the nature of the said invention what I claim is:

1. A wheel hub structure adapted to provide a plurality of gear ratios and comprising in combination, an outer hub having an interior gear thereon, driving means, an inner hub fixed to said driving means, a central fixed shaft, a sun gear mounted on said shaft and having a clutch member fixed thereto, gearing carried by said inner hub and intermediate said sun gear and said interior gear on the outer hub, a worm fixed to said shaft, a threaded clutch member carried by said worm, a member having frictional engagement with said sun gear and adapted to be thrown into or out of frictional engagement with said threaded clutch member, and means for providing a direct drive between said inner hub and said outer hub when said sun gear is disengaged from said threaded clutch member.

2. A wheel hub structure adapted to provide a plurality of gear ratios and comprising in combination, an outer hub having an interior gear thereon, driving means, an inner hub fixed to said driving means, a central fixed shaft, a sun gear loosely mounted on said shaft, gear mechanism carried by said inner hub member and meshing with said sun gear and said interior gear on the outer hub, a clutch member fixed to said sun gear, a worm fixed to said shaft, a threaded clutch member carried by said worm and adapted to engage the clutch member on said sun gear, a member having frictional engagement with said sun gear and adapted to be thrown into or out of engagement with said threaded clutch member, and means for providing a direct drive between said inner hub and said outer hub when said sun gear is disengaged from said threaded clutch member.

3. In a wheel hub structure in combination, an outer hub, an inner hub having means associated therewith for driving the same, cam members mounted within said outer hub adapted either to brake the hub or to drive the same, a member rotatable within said outer hub on which said cam members are pivotally mounted, and projections carried by said inner hub for turning said cam members into the braking or driving position according as the rider pedals backward or forward.

4. A wheel hub structure comprising in combination, an outer hub having an interior gear thereon, driving means, an inner hub fixed to said driving means, a central fixed shaft, a sun gear loosely mounted on said shaft, gearing carried by said inner hub and meshing with said sun gear and with the interior gear on the outer hub, and means for clutching said sun gear to said shaft comprising a worm fixed to said shaft, a threaded clutch member carried by said worm, and a member arranged to rotate with said sun gear and having frictional engagement with said sun gear and said threaded clutch member.

In witness whereof I have subscribed my signature in the presence of two witnesses.

FREDERIK JOHANNES OLSEN.

Witnesses:
CECIL VILHELM SCHON,
WANDA SLETTING.